SOLID STATE ELECTRICAL DEVICES UTILIZING PHONON PROPAGATION

Filed Aug. 1, 1961

INVENTOR.
RUBIN BRAUNSTEIN
BY
Morris Rabkin
ATTORNEY 3,200,259

SOLID STATE ELECTRICAL DEVICES UTILIZING PHONON PROPAGATION

Rubin Braunstein, Princeton, N.J., assignor to Radio Corporation of America, a corporation of Delaware Filed Aug. 1, 1961, Ser. No. 128,516
7 Claims. (Cl. 307—88.5)

The present invention relates to electrical devices, and more particularly to solid state electrical devices, and also to means for operating said devices.

The invention is especially suitable for use in electrical components adapted for translating, amplifying and modulating various forms of energy, such as electrical energy, radiation energy and the like. The electrical energy may be electrical signals. The radiation energy may be infrared radiation.

The atoms of many semiconductors are arranged in space in an array known as a lattice. The lattice is subject to vibrations called lattice vibrations. These vibrations have various modes and various wavelengths. The vibrations also propagate through the lattice. The lattice vibrations may be quantized in energy in accordance with quantum theory. A quantum of energy of a lattice vibration is called a phonon.

Energy states for electrons and holes in semiconductors have also been prescribed in accordance with the quantum theory. There are energy states for electrons and holes in the valence band and in the conduction band of a semiconductor, and ordinarily there are no energy states in the gap between the valence and conduction bands. When a charge carrier makes a transition or moves between the valence band and the conduction band, energy either is absorbed or emitted. This energy can excite or de-excite lattice vibrations. The quantum of energy which the electron or hole gains or loses in one transition is $h\nu$, where $h$ is Planck's constant and $\nu$ is the frequency of atomic vibration with which an electron or hole interacts with the lattice in exciting or de-exciting lattice vibrations. This quantum of energy is the energy of the phonon. Phonons may be excited by other processes as, for example, by collisions between free charge carriers and the lattice of a semiconductor, or by transfer of heat or light energy to the lattice. Such other phonon generation methods have not been susceptible of accurate control. Also, phonons are not known to have been advantageously used to control electrical and physical characteristics in devices employing semiconductive materials.

There are known semiconductor devices, called tunnel diodes, in which there are present thin or abrupt P-N junctions and in which the free charge carrier distribution on both sides of the junction is very high compared to the usual P-N junction diode. By an abrupt junction is meant one in which the depletion region between the P and N type regions is about 200 A. (angstrom units) or less in thickness. In a tunnel diode, the Fermi level on the P side of the junction is in the valence band and the Fermi level on the N side of the junction is in the conduction band. The diode conducts current in the forward direction by quantum mechanical tunneling of majority charge carriers through the junction. By tunneling, as in a tunnel diode, each free charge carrier makes a transition between the conduction band and valence band or vice versa.

Current through other types of junctions may be associated with a tunneling mechanism. The term junction, as used herein, is intended to define any conductive barrier which transmits charge carriers more readily in one direction than in an opposite direction. For example, tunneling can occur through a barrier junction in which a conducting layer makes blocking contact with a semiconductor. A blocking contact is of the type which gives rise to a potential barrier in the contact which opposes the passage of charge carriers in one direction. Accordingly, junctions through which current is conducted by charge carrier tunneling are referred to hereinafter as tunnel junctions.

It is an object of the invention to provide electrical devices of the solid state type wherein phonons are used to signals, control current, or exercise other control functions, as contrasted with solid state devices of the usual type, such as diodes and transistors, wherein free charge carriers are used to carry signals and to control current through the device.

It is a further object of this invention to provide improved solid state amplifier devices.

It is a still further object of the present invention to provide improved solid state devices having inputs and outputs which can be electrically isolated from each other, such that the device is non-reciprocal in operation, that is, the input and output of the device cannot be interchanged without consequence.

It is a further object of the invention to provide electrical devices of the solid state type for modulating radiation and otherwise controlling the transmission thereof.

The present invention is based on the observation that tunnel junctions function as phonon emitters. For example, the tunneling of an electron from a higher energy state in the conduction band to a lower energy state in the valence band can create a phonon. The quantity of phonons emitted at the tunnel junction is related to the number of free charge carriers which tunnel through the junction. Since the forward current through the junction corresponds to the number of tunneling charge carriers, the quantity of phonons can be controlled by controlling this current.

Various properties of a semiconductor are related to the phonon population in the semiconductor, since the phonons interact with the electrons and holes therein. Such interactions can transfer energy to or from an electron or hole and increase or decrease the probability that the electron or hole will travel across a rectifying junction. The number of electrons in the conduction band and, therefore, the conductivity of a semiconductor is related to the phonon population. The radiation transmission or absorption spectrum of a semiconductor is also dependent upon the phonon population therein, since phonons and photons (quanta of radiation energy) interact with each other.

A solid state device in accordance with the invention may include a body of semiconductive material having a tunnel junction present therein which is operated for emitting controlled quantities of phonons. Means are operatively associated with the body which detect the phonons emitted at the junction by responding to phonon interactions in the semiconductive body. Such phonon detector means may be a rectifying junction of some type such as a P-N junction, another tunnel junction, or a barrier junction formed on the semiconductive body. Other phonon detection means may be responsive to the conductivity of the semiconductive body. Still other phonon detection means may detect the radiation through the semiconductive body.

The invention itself, both as to its organization and method of operation, as well as additional objects and advantages thereof, will become more readily apparent from a reading of the following description in connection with the accompanying drawings in which.

Figure 1:
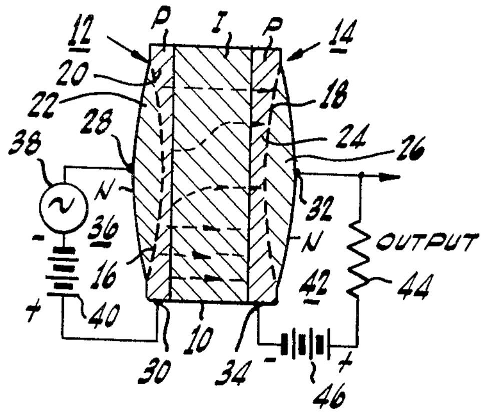
FIG. 1 is a view partly in section and partly diagrammatic, showing one form of solid state device in accordance with the invention and one form of circuit, in accordance with the invention, for operating the device.

Referring more particularly to FIG. 1, there is shown a body 10 of intrinsic, semiconductive material, i.e., one which contains no significant impurities, so that the material is neither N nor P type. The material of the body 10 may be any semiconductive material such as germanium, silicon, or a material selected from the group of III–V compounds or II–VI compounds. The III–V compounds include materials from the third and fifth groups of the Periodic Table of Chemical Elements, and II–VI compounds include materials selected from the second and sixth groups of the Periodic Table of Chemical Elements. Devices 12 and 14 which define junctions 16 and 18 (shown by the dash lines) are disposed on opposite faces of the body 10. The junction 16 is desirably a tunnel junction whereas the junction 18 may be a tunnel junction, a P-N junction of the usual type or a barrier junction. A tunnel junction 18 is provided in the device shown in FIG. 1 by way of example.

The device 12 includes a body 20 of semiconductive material, illustrated as being of P conductivity type, and another body 22 of semiconductive material, illustrated as being of N conductivity type. The bodies 20 and 22 desirably have relatively high free charge carrier densities as compared to semiconductive materials used in P-N junction diodes of the usual type. Their free charge carrier densities may be of the order of $1\times10^{19}$ per cubic centimeter. The term "relatively high free charge carrier concentration," as used hereinafter, is intended to define the relationship of charge carrier densities expressed above. The device 12 is fabricated so that the tunnel junction 16 is an abrupt junction such as will facilitate the tunneling of charge carriers therethrough. The junction 16 may be formed by any usual technique, such as melt growing or alloying. The body 20 may be integral with the body 10 and may be formed thereon by diffusion, vapor deposition or the like with little discontinuity in the interface between the bodies 10 and 20.

The device 14 includes a first body 24 of semiconductive material and another body 26 of semiconductive material with the tunnel junction 18 therebetween. The bodies 24 and 26 may, similarly to the bodies 20 and 22, be of semiconductive materials having relatively high free charge carrier concentrations. The junction 18 may be formed in the same manner as the junction 16, and the body 18 may be secured to the body 10 in the same manner as the body 20.

Although P type bodies 20 and 24 are shown disposed against the opposite faces of the intrinsic body 10 in FIG. 1, it may be desirable, in some cases, to form one of the bodies 20 or 24 of P type material while the other of these bodies is formed of N type material. In such cases, one of the outer bodies 22 and 26 will be of N type material while the other is of P type material. This may facilitate the connection of the device in certain electronic circuits where certain biasing potentials already exist.

Ohmic connections 28 and 30 are, respectively, made to the bodies 22 and 20 of the device 12. Ohmic connections 32 and 34 are similarly, respectively, made to the bodies 26 and 24 of the device 14. These connections may be made by applying to the bodies conductive paint (e.g., silver paint) and by soldering leads to this paint. When the electrical device of FIG. 1 is operated as an amplifier, an input circuit 36 including a source 38 of signals and a source of biasing potential, illustrated as a battery 40, are connected in series through the ohmic connections 28 and 30. An output circuit 42 including an output resistor 44 and a source of biasing voltage (e.g., a battery) 46 are connected in series between the connections 32 and 34. The battery 40 in the input circuit 36 is polarized to bias the junction 16 in the forward direction. The battery 46 in the output circuit 42 is polarized to bias the junction 18 in the reverse direction. The input circuit 36 and the output circuit 42 will be isolated from each other since charge carriers which might travel through the intrinsic body 10 will be repelled at the potential barrier in the region of the junction 18. The device of FIG. 1 is made non-reciprocal by means of appropriate biasing because the input and output characteristics thereof depend upon the biasing.

The junction 16 functions as an emitter of phonons. These phonons are shown diagrammatically by the dotted transverse lines between the junctions 16 and 18 in FIG. 1. Accordingly, the junction 16 will be referred to hereinafter as an emitter junction. The junction 18 responds to these phonons and will be referred to hereinafter as a detector junction.

It is preferable that the device of FIG. 1 be as small as possible consistent with fabrication techniques. For example, in a preferred form of the device, the width of the intrinsic body 10 may be about one mil (thousandth of an inch). The relatively small size of the device shown in the drawings has necessitated exaggeration of size and of proportions in the interest of clarity in the illustrations, which are mainly diagrammatic.

By way of example, the device of FIG. 1 may be fabricated in accordance with the following procedure: The body 10 may be a single crystal wafer of germanium which can be formed from a bar made by pulling a seed crystal from molten germanium of very high purity (that is, low in purity concentration, either donor or acceptor). The wafer is cut from the bar. The P type bodies 16 and 18 may be formed by providing a skin of semiconductive material having a relatively high free charge carrier concentration on the bar. This may be accomplished, for example, by placing the bar in a vapor including vaporized impurity elements, such as gallium or indium. The wafer is left in the vapor for an appropriate time until a layer of P type germanium of appropriately high free charge carrier concentration forms thereon. Such an appropriate time may be five minutes. The time should be sufficient to form a layer having an acceptor (hole) concentration of the order of $1 \times 10^{19}$ per cubic centimeter. the layers constitute the bodies 20 and 24. After the bodies are formed, the edges of the intrinsic body may be etched to remove all traces of the P type material therefrom. The exposed layers 20 and 24 are also etched.

The junctions 16 and 18 may be formed by the alloying technique by alloying a dot including arsenic alloyed with indium or lead. The wafer and dot may be placed in an oven having a reducing atmosphere of hydrogen and fired at a temperature between 300° and 500° C. for a firing time of a few minutes. This time is short to prevent diffusion of the junction. After alloying, the body is cooled rapidly also to prevent diffusion and insure abrupt junctions 16 and 18.

Figure 2:
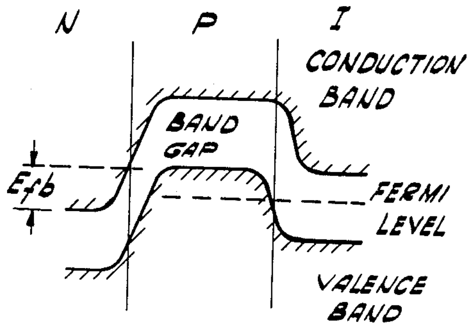
FIG. 2 is an energy diagram illustrating the valence and conduction bands of a portion of the device shown in FIG. 1.

The operation of the device of FIG. 1 will be better understood with reference to FIG. 2 which shows the conduction band and valence band in the device 12 in an adjacent portion of the intrinisic body 10. It will be understood that the diagram of FIG. 2 and the theory in accordance with which it is drawn are used herein solely for purposes of description and its use does not imply adherence to any particular theory. There is a copious supply of free charge carries (electrons) in the N type material and a similarly copious supply of free charge carriers (holes) in the P type material. Accordingly, the Fermi level is in the conduction band of N type material and in the valence band of the P type material. The diagram of FIG. 2 shows the conditions at normal temperatures with an applied forward bias. The current through the junction is attributable to the tunneling of the electrons (majority charge carriers) across the forbidden band between the conduction band in the N type material and the valence band in the P type material. Tunneling is believed to occur because the probability that the electrons in the conduction band will see energy states that they may occupy in the valence band in the P type material is relatively high. This probability is made sufficiently high by the applied forward bias which displaces the band edges with respect to the Fermi level, as shown, between the N and P regions in FIG. 2. This bias provides an energy shown in the drawing as $E_{fb}$. Since the electron energy states in the conduction band are higher than in the valence band, the transition each electron makes across the forbidden band is accompanied by a loss of energy. This energy can excite lattice vibrations and can cause the emission of phonons. The number of phonons is related to the number of charge carriers which make the transition across the forbidden band. Accordingly, by controlling the tunnel current through the junction, as by means of signals from the source 36 (FIG. 1), the number of phonons which are emitted at the junction 16 may be controlled.

The phonons propagate through the P type body 20, through the intrinsic body 10, and into the other P type body 24. Collisions will occur between electrons or holes and phonons in the bodies 20 and 24 as the phonons travel therethrough. An electron or hole can change its energy state when a phonon collides therewith, in accordance with the law of conservation of energy. Thus, an electron in the vicinity of the detector junction 18, which gains sufficient energy because of an electron-phonon collision, can tunnel through the junction 18 from the valence band in the P type body 24 to the conduction band in the N type body 26. The electron-phonon collisions in the vicinity of the detector junction 18 are most significant. It is desirable to minimize such collisions near the emitter junction 16. Accordingly, the body of intrinsic material 10 is especially suitable since it contains relatively few free charge carriers with which the phonons may collide and be destroyed by giving up their energy before reaching the region of the detector junction 18.

It will be appreciated that other junctions, such as P-N junctions and barrier junctions, may be used alternatively with tunnel junctions as a collector junction 18. The collision between electrons and phonons will impart sufficient energy to the electrons to permit them to rise over the potential barrier in the P-N junction and the barrier junction. Accordingly, the flow of current through the detector junction will be related to the population of phonons in the vicinity thereof. This current flows through the output resistor 44. Since the population of phonons is related to the current through the emitter junction 16, which current is a function of the input signal from the source 38, the current through the resistor 44 will be a function of the input signal. The gain of the amplifier device is a function of the input and output biasing voltages. A small input signal can cause a large change in the output signal voltage. Thus, small changes in current across the junction are accompanied by large changes in voltage. These changes in voltage may be produced by small input signals. The frequency response of the amplifier depends upon the distance between the emitter junction and the detector junction, since the phonons travel at the velocity of sound in the solid (approximately $1 \times 10^5$ centimeters per second). Accordingly, the thickness dimension of the device is preferably as small as possible, consistent with fabrication techniques.

Figure 5:
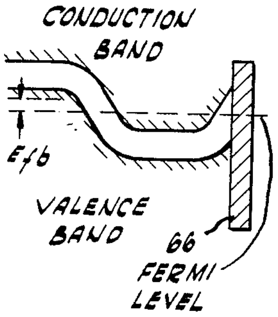
FIG. 5 is an energy diagram of the valence and conduction bands in a portion of the device shown in FIG. 4.

The emitter junction may be formed by utilizing an N type substrate body 20 and a P type junction forming body 22, rather than a P type body 20 and N type body 22. The energy diagram of a device having P type outer body and N type inner body which form an emitter junction is shown in FIG. 5. In such an emitter junction, the emission of phonons accompanies the transistion of holes from a high energy state in the valence band to a lower energy state in the conduction band. Such phonons propagate through the device and inpart energy to electrons by electron-phonon collision, as explained in connection with FIG. 2.

It will be appreciated that the foregoing theory of operation involving electron hole collision is presented solely for purpose of explanation of a present understanding of the operation of the device. Phonon interaction may occur by other processes than those explained above. The present invention derives beneficial results by reason of phonon interaction. Accordingly the present invention is not to be construed to be limited to any theory of operation of the devices disclosed herein (e.g., electron-phonon collisions).

Figure 3:
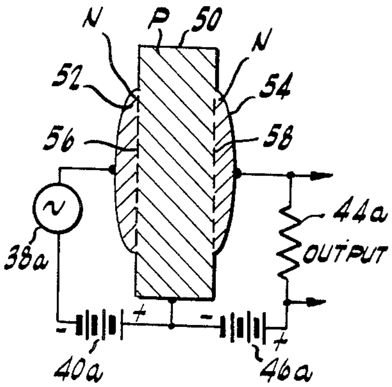
FIG. 3 is a view similar to FIG. 1 showing another form of solid state device and circuit for operating the same in accordance with another embodiment of the invention.

Referring to FIG. 3, there is shown a solid state device similar to the device shown in FIG. 1, except that a single body 50 of P type semiconductive material having a relatively high free charge carrier concentration is utilized to form the substrate for bodies 52 and 54 of N type material. The respective bodies 52 and 54 define an emitter tunnel junction 56 and a detector tunnel junction 58. Ohmic connections are made to the bodies 52 and 54. Input and output circuits similar to those shown in FIG. 1 are connected to these ohmic contacts. Components of the circuit of FIG. 3, which are like those of FIG. 1, are identified by the same reference numerals having the subscript "*a*" appended thereto. The path of phonons through the P type body 50 will be shorter than that through the intrinsic body 10 (FIG. 1). However, the material of the body 50 may, for example, be P or N type germanium which has a relatively long mean free path for low frequency phonons so that sufficient phonons may reach the vicinity of the detector junction 54 and affect the flow of current therethrough. In other respects, the operation of the device shown in FIG. 3 is similar to the operation of the device shown in FIG. 1 and explained in connection with FIG. 2.

Figures 4, 6:
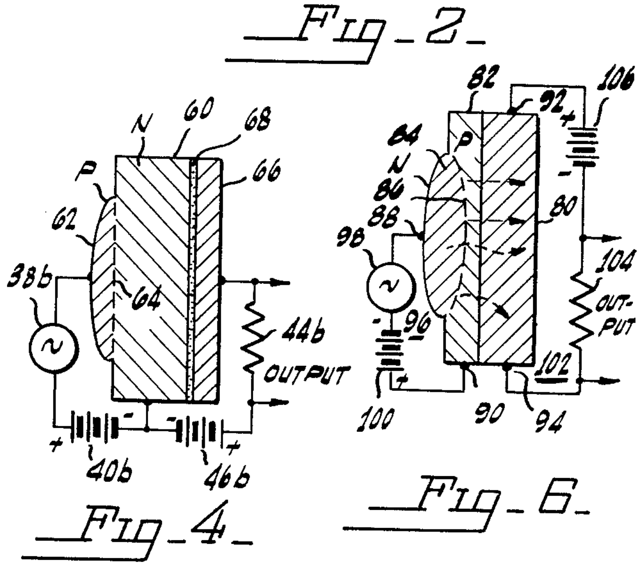
FIG. 4 is a similar view of a solid state device and a circuit therefor in accordance with still another embodiment of the invention.
FIG. 6 is a view similar to FIGS. 1, 3 and 4 of a solid state device and circuit for operating said device in accordance with still another embodiment of the invention.

Referring to FIG. 4, there is shown a solid state device including a body 60 of semiconductive material having a relatively high free charge carrier concentration and illustrated as being of N type, and a body 62 of P type semiconductive material also of relatively high free charge carrier concentration. A P–N emitter tunnel junction 64 is formed between the bodies 60 and 62, for example, by the alloying techniques mentioned above. A metal electrode 66 is disposed in blocking contact with a face of the body 60 opposite to the junction 64 for forming a barrier detector junction 68. Ohmic connections are made to the body 60, the body 62 and electrode 66. Circuitry similar to the circuitry shown in FIG. 1 is connected to these ohmic contacts. Components of the circuit of FIG. 4 which are like those of the circuit of FIG. 1 are identified by like reference numerals having the subscript "*b*" appended thereto. It will be noted that the polarization of the battery 40*b* is different than that of the battery 40 since the conductivity types of the bodies 60 and 62 are, respectively, opposite the conductivity types of the bodies 20 and 22. Accordingly, the emitter junction 64 will be biased in the forward direction.

The barrier junction 68 may be formed by etching the face of the body 60 with an etch containing oxidizing agents, e.g., hydrochloric acid, nitric acid, and water. A thin layer of metal is then plated over or evaporated on the etched surface. Connections are made to the metal layer.

The operation of the device of FIG. 4 will be more fully explained by the aid of the energy diagram of FIG. 5. Because the material of the body 62 has a relatively high free charge carrier concentration, there will be a copious supply of holes on the P side of the junction such that the Fermi level on the P side of the junction will be in the valence band. Similarly, since the N type material of the body 60 has a relatively high free charge carrier concentration, there will be a copious supply of electrons in the N type body 60. Accordingly, the Fermi level in the N type material 60 will be in the conduction band. The junction 64 is biased in the forward direction by a voltage $E_{fb}$. Accordingly, there will be a high probability that holes will tunnel through the junction and make transitions from the valence band to the conduction band. These transitions may be accompanied by a loss of energy. Phonons are, therefore, emitted at the emitter junction in accordance with the law of conservation of energy. A potential barrier is formed at the barrier junction 68, since the electrons tend to become concentrated at the surface of a semiconductor. The theory for formation of such a barrier will be found in the text "Solid State Physics" by A. J. Dekker, published by Prentice-Hall, Englewood Cliffs, New Jersey (1957) (See section 14–14). Phonon-electron collisions will impart energy to the electrons in the vicinity of the barrier junction 68 which will cause the electrons to climb over the barrier into the electrode 66. The current through the barrier junction 68 which flows through the output resistor 44 is, therefore, a function of the population of phonons in the vicinity of the junctions 68. Since this phonon population is also a function of the signal applied across the emitter junction 64 by the signal source 38*b*, the current through the output resistor 34*b* will correspond to the input signal. Amplification occurs in the device of FIG. 4, since relatively large amounts of current from the biasing battery 46*b* can be controlled by propagating phonons into the vicinity of the junction 68.

Referring to FIG. 6, there is shown a phonon controlled device in which the conductivity of a body 80 of intrinsic, semiconductive material is controlled by phonon interactions therein. This body 80 may be similar to the body 10 of intrinsic, semiconductive material (FIG. 1). A body 82 of P type semiconductive material having a relatively high free charge carrier concentration is formed on a side face of the body 80. Another body 84 of N type semiconductive material also having a relatively high free charge carrier concentration defines a phonon emitter junction 86 with the P type body 82. The device of FIG. 6 may be constructed in the same manner as the device of FIG. 1 except that only one exposed side face of the intrinsic, semiconductive material body 80 forms the substrate for the bodies 82 and 84 of semiconductive material which define the tunnel junction therebetween.

Ohmic connections 88 and 90 are made to the N type and P type bodies 84 and 82 so that signals can be applied across the emitter junction 86. Ohmic connections 92 and 94 are also made to opposite edges of the intrinsic body 80.

An input circuit 96 is connected between the ohmic contacts 88 and 90 and includes a source 98 of input signals and a source of biasing voltage, illustrated at a battery 100. An output circuit 102 is connected between the ohmic contacts 92 and 94 to the intrinsic body 80 and includes an output resistor 104 and source of biasing voltage, illustrated as a battery 106.

When signals are applied from the source 98 across the emitter junction 86, the number of phonos which are propagated from the junction into the intrinsic body 80 varies in accordance with the amplitude of the signals from the source 98 and at a rate in accordance with the frequency of these signals.

The conductivity of the intrinsic body 80 is controlled in accordance with the phonon population therein. It is presently believed that a physical mechanism responsible for the phonon controlled conductivity of the body 80 involves collisions of the phonons with free electrons and with imperfections in the lattice of the intrinsic body 80. Such imperfections may be due to impurity atoms in the body 80, atoms missing from their normal positions in the crystal lattice of the body 80, and the like. Interactions between the phonons and the imperfections is believed to cause the release of free electrons. For example, an electron may derive energy from a phonon and be released from an imperfection with sufficient energy to jump from the valence band to the conduction band of the material of the body 80. Other free electrons may derive energy from the phonon and be raised into the conduction band. Since the electrical conductivity of a semiconductive material depends upon the number of electrons in the conduction band of that material, the phonon population is a controlling factor in the conductivity of a semiconductive body, such as the body 80.

Another mechanism which is believed to be responsible for the phonon controlled conductivity in the body 80 is the mobility of the charge carriers. Mobility of charge carriers is defined as the ratio of the average velocity of the charge carrier to the magnitude of an applied electric field. When the charge carriers have high mobility, they move freely through a semiconductive body and the body appears to have high conductivity. When phonons collide with a free charge carrier, momentum is conserved. Accordingly, the velocity of an electron, for example, is increased and its mobility improved.

The biasing battery 106 will cause a certain quiescent current to flow through the output resistor 104 in the absence of applied signals from the source 98. When signals from the source are applied, the phonon population in the intrinsic body 80 and the conductivity thereof will change. The conductivity will determine the current through the output resistor 104. This output current will correspond to the input signals. Since a relatively small input signal can control a relatively large current flow through the intrinsic body 80 and through the output resistor 104, the device of FIG. 6 is operative as an amplifier. The device of FIG. 6 is also non-reciprocal since the bias applied across the intrinsic body 80 will not cause the generation of phonons, electrons, holes or electron hole pairs. Accordingly, the input circuit 96 and the output circuit 102 will be isolated electrically from each other. It may be desirable to provide a conductivity controlled device similar to the device of FIG. 6 wherein the output circuit 102 is connected directly across one of the semiconductive bodies which define the tunnel emitter junction (for example, across the body 82). The use of a very thin junction forming body 82 and on a somewhat larger substrate body 80 of intrinsic material is preferred at the present time for fabrication purposes, and since phonons have a shorter mean frequency path in the semiconductive body 82 than in the intrinsic body 80.

Figure 7:
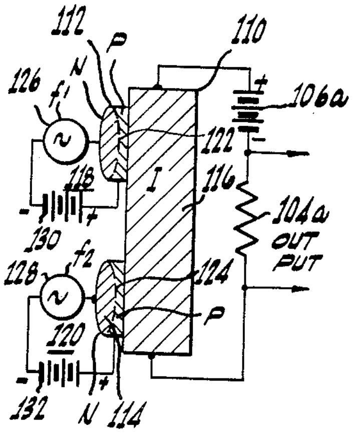
FIG. 7 is a similar view of a modulator or mixer device and of a circuit for operating said device in accordance with the invention.

Referring to FIG. 7, there is shown a device 110 similar to the device shown in FIG. 6 except that two pairs 112 and 114 of junction forming bodies are formed on the same exposed side face of an intrinsic, semiconductive material body 116. Two input circuits 118 and 120 are respectively connected to ohmic connections across the junction 122 of the first pair of junction forming bodies 112 and across the junction 124 of the second pair of junction forming bodies 114. The circuits 118 and 120 respectively include sources 126 and 128 of signals which may be at different frequencies $f_1$ and $f_2$. Biasing sources (batteries) 130 and 132 are connected in series with the sources 126 and 128, respectively. An output circuit, including an output resistor 104a and a biasing battery 106a, is connected in series between the ohmic contacts to the opposite edges of the body 116.

In operation, the input circuit biasing batteries 130 and 132, respectively bias the junctions 122 and 124 in the forward directions for the emission of phonons. The population of phonons propagated into the intrinsic body 116 is controlled both by the signals from the source 126 and the signals from the source 128. The current through the intrinsic body 116, which may be detected as the voltage across the output resistor 104a, is the mixed or modulation product of the signals of frequencies $f_1$ and $f_2$ from the sources 126 and 128. It is believed that complex lattice vibrations or other interactions occur in the crystal of the body 116 which generate a number of phonons, this number being related to the modulation products of the $f_1$ signal and the $f_2$ signal from the sources 126 and 128. More than two pairs 112 and 114 of junction forming bodies may be provided if more than two signals are to be mixed or modulated.

Figure 8:
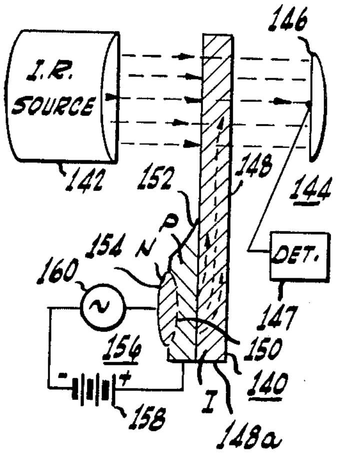
FIG. 8 is a similar view of a solid state device in accordance with still another embodiment of the invention and a schematic diagram of a system and of a circuit according to the invention for operating the same.

Referring to FIG. 8, there is shown a solid state device 140 which controls the transmission of radiation and can be used to modulate radiation from a source prior to propagation thereof through space to radiation detectors. A source of radiation 142, as illustrated in FIG. 8, is a source of infra-red radiation, such as a glowing bar or a device known as an optical maser. A light optical maser (or "laser") is described in an article appearing in the Scientific American, June 1961, pages 52 to 61. This radiation may be focused by means of a reflector which is part of the source 142. The radiation is propagated along a path to a detector 144. This detector may include a reflector 146 and a radiation excited electrical device, such as a thermocouple 147 or the like.

The device 140 includes a body 148 of semiconductive material which may be of P type. A layer 152 of P type semiconductive material having a relatively high free charge carrier concentration (higher than that of the body 148) may be diffused into the body 148 near one end 148a thereof. This may be accomplished by placing the body 148 in a vapor of conductivity type forming impurities, as for the body 10 (FIG. 1), and then etching or lapping away the layer except near the one end 148a of the body 148. A body 154 of N type semiconductive material of relatively high free charge carrier concentration is deposited on the layer 152 to form an abrupt phonon emitter tunnel junction 150. The junction 150 is formed near one end 148a of the body 148 so that the opposite end thereof can be disposed in the path of the radiation from the source 142 to the detector 144.

An input circuit 156 includes a bias source such as a battery 158 and a source 160 of signals connected in series between ohmic connections to the P type body 152 and the N type body 154. The battery 158 biases the junction 150 in the forward direction for the emission of phonons. The population of phonons is controlled by the signals from the source 160. These phonons are propagated through the body 148, as shown in the drawing by the dotted lines therein.

The absorption spectrum and the intensity of absorption of radiation from the source 142 by the body 148 are dependent upon the population of phonons in the body 148. It is believed that the phonon interaction with electrons in the body 148 transfers energy thereto. For example, by a phonon-electron collision, electrons may be raised in energy into the conduction band. When the electrons are in the conduction band, they can absorb very little radiation energy in the form of photons. Accordingly, the more phonons present in the body 148, the less radiation absorption by the body 148.

The population of phonons also controls the frequency spectrum by a mechanism which involves the addition of the energy of the photons ($h\nu$ photon) to the energy of the phonons ($h\nu$ phonon). The frequency of the phonons due to the radiation which will then be absorbed by the body 148 may be lower in the presence of phonons than in the absence thereof. In other words, the phonon population in the body increases the width of the spectral line of the body 148 (the range of radiation frequencies absorbed) as detected by the detector 144. The device 140 operates as a radiation modulator by controlling both the intensity and frequency of the radiation passing therethrough.

The speed of operation of the device 140 will be determined by the length of the propagation path of the phonons and the speed of propagation in the medium. It is, therefore, desirable to make the distance from the emitter junction 150 to the radiation interaction region of the device 140 as small as possible. The speed of operation is also controlled by the time required for the phonon energy to decay. This time is relatively short and may be approximately $1\times10^{-11}$ seconds which is about the order of magnitude of the period of lattice vibrations.

From the foregoing description, it will be apparent that there have been provided improved solid state devices and circuits for operating the same. These devices utilize phonon control of signal transmission, amplification, modulation, and the like functions. Several devices in accordance with the invention have been shown and described herein. However, variations in these devices and the circuits used therewith, all coming within the spirit and scope of the invention will, no doubt, suggest themselves to those skilled in the art. Hence, the foregoing description and drawings should be considered illustrative and not in any limiting sense.

What is claimed is:

1. A solid state device comprising a body of semiconductive material having a region which supports the propagation of phonons, a tunnel junction in operative relation with said body, means for operating said junction to emit phonons into said region of said body, and means also in operative relation with said region of said body for detecting said phonons which propagate into said region, said region which supports the propagation of phonons having a long mean free path for said emitted phonons so that said emitted phonons are propagated through said region.

2. A solid state device comprising a body of semiconductive material defining a path of propagation for phonons, means in operative relationship with said body providing a tunnel junction on one face thereof, circuit means for applying signals across said tunnel junction including means for biasing said tunnel junction in the forward direction for emitting phonons into said body which propagate along said path, and phonon detector means including a barrier junction on another face of said body which intercepts said path, said body which defines a path of propagation for phonons having a long mean free path for said emitted phonons so that said emitted phonons are propagated along said path.

3. A solid state device which comprises a body of intrinsic, semiconductive material of predetermined material and thickness for supporting the propagation of phonons therethrough, a first body of semiconductive material of relatively high free charge carrier concentration on one face of said intrinsic body, a second body of semiconductive material of relatively high free charge carrier concentration on another face of said intrinsic body, a third body of semiconductive material of relatively high free charge carrier concentration and of conductivity type opposite to the conductivity type of said first body defining a tunnel junction therewith, a fourth body of semiconductive material of relatively high free charge carrier concentration and of opposite conductivity type to said second body defining another tunnel junction therewith, and input circuit means for biasing the tunnel junction between said first and third bodies in the forward direction, and output circuit means for biasing the tunnel junction between said second and fourth bodies in the reverse direction.

4. A solid state device comprising a body of intrinsic, semiconductive material which supports the propagation of phonons therethrough, a second body of semiconductive material disposed in contact with one face of said intrinsic body, said second body having a tunnel junction therein, and means coupled to said first and second bodies for generating phonons at said junction which pass into said intrinsic body to vary its conductivity as a function of the number of phonons passed into said intrinsic body, means responsive to the conductivity of said intrinsic body for providing an output signal from said device, said first body which supports the propagation of phonons therethrough having a long mean free path for said generated phonons so that said generated phonons are propagated through said first body.

5. In an electrical system for radiation propagated along a path, a solid state radiation modulator device which comprises a body of intrinsic, semiconductive material which supports the propagation of phonons therethrough, said body being disposed across said path, means providing a tunnel junction in operative relation with said body, and circuit means including a source of modulating signals connected across said junction for emitting phonons into said intrinsic body, said phonons being operative to change the radiation absorption spectrum of said body so as to modulate said radiation, said body which supports the propagation of phonons therethrough having a long mean free path for said emitted phonons so that said emitted phonons are propagated through said body.

6. A solid state device for mixing a plurality of signals which comprises a body of semiconductive material having a region which supports the propagation of phonons therethrough, a plurality of means in operative relation with said body each for defining a separate tunnel junction therewith, means for biasing each of said junctions in the forward direction and for applying each of said signals separately to different ones of said junctions for injecting numbers of phonons into said region which are functions of said respective signals, and means responsive to changes in the conductivity of said region of said body insulating from interactions involving said injected phonons for obtaining an output signal corresponding to the mixing of said plurality of signals with each other, said region which supports the propagation of phonons therethrough having a long mean free path for said injected phonons so that said injected phonons are propagated through said region.

7. A solid state device comprising a body of semiconductive material having three contiguous regions, the second of which is disposed between the first and third of said regions, means coupled to said first region for generating phonons therein, means coupled to said third region for detecting said phonons which reach said third region, said second region comprising a body of material having a long mean free path for said phonons so that said phonons generated in said first region propagate from said first region to said third region.

References Cited by the Examiner

UNITED STATES PATENTS

| | | | |
|---|---|---|---|
| 2,692,950 | 10/54 | Wallace | 250—83.3 |
| 2,776,367 | 1/57 | Lehovec | 307—88.5 |
| 2,801,348 | 7/57 | Pankove | 307—88.5 |
| 2,983,854 | 5/61 | Pearson | 317—235 |
| 3,056,073 | 9/62 | Mead | 317—234 |
| 3,059,117 | 10/62 | Boyle et al. | 317—235 |
| 3,105,177 | 9/63 | Aigrain et al. | 307—88.5 |

ARTHUR GAUSS, *Primary Examiner.*

JOHN W. HUCKERT, *Examiner.*

UNITED STATES PATENT OFFICE
CERTIFICATE OF CORRECTION

Patent No. 3,200,259 August 10, 1965

Rubin Braunstein

It is hereby certified that error appears in the above numbered patent requiring correction and that the said Letters Patent should read as corrected below.

Column 12, line 7, for "insulating" read -- resulting --.

Signed and sealed this 14th day of June 1966.

(SEAL)
Attest:

ERNEST W. SWIDER
Attesting Officer

EDWARD J. BRENNER
Commissioner of Patents